US011671912B2

(12) United States Patent
Puthenpura et al.

(10) Patent No.: US 11,671,912 B2
(45) Date of Patent: Jun. 6, 2023

(54) CELLULAR COMMUNICATION NETWORK SLEEP MANAGEMENT

(71) Applicant: AT&T Intellectual Property I, L.P., Atlanta, GA (US)

(72) Inventors: Sarat Puthenpura, Berkeley Heights, NJ (US); Xuan Liu, Bridgewater, NJ (US); Ioannis Broustis, Basking Ridge, NJ (US); He Yan, Berkeley Heights, NJ (US); Slawomir Stawiarski, Carpentersville, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 119 days.

(21) Appl. No.: 17/198,363

(22) Filed: Mar. 11, 2021

(65) Prior Publication Data

US 2022/0295393 A1    Sep. 15, 2022

(51) Int. Cl.
*H04W 52/02* (2009.01)
*H04W 24/08* (2009.01)

(52) U.S. Cl.
CPC ....... *H04W 52/0206* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 2014/0105056 A1* | 4/2014 | Li | H04W 52/0203 370/252 |
| 2017/0034750 A1* | 2/2017 | Tamura | H04W 36/0061 |
| 2020/0314745 A1* | 10/2020 | Yi | H04W 72/14 |
| 2022/0174589 A1* | 6/2022 | Bellamkonda | H04W 52/0206 |

* cited by examiner

*Primary Examiner* — Saad Khawar
(74) *Attorney, Agent, or Firm* — Amin, Turocy & Watson, LLP

(57) ABSTRACT

The described technology is generally directed towards cellular communication network sleep management. A central network automation platform can control sleep settings deployed to radio access network nodes that support the cells of the cellular communication network. The network automation platform can collect cell configuration data and can use the cell configuration data to determine sleep settings for sleep-eligible cells. The network automation platform can furthermore monitor performance of the sleep-eligible cells and neighbor cells to determine whether the sleep settings have led to degraded performance.

20 Claims, 10 Drawing Sheets

CELLULAR COMMUNICATION NETWORK SLEEP MANAGEMENT

TECHNICAL FIELD

The subject application is related to cellular communication systems, e.g., to managing energy consumption of equipment used in radio access network nodes.

BACKGROUND

A cellular communication network can significantly reduce its energy consumption by enabling network equipment to initiate a sleeping state when a cell is not needed. For example, when customer traffic at a cell is low, the cell can enter a sleeping state. Reducing energy consumption in this manner has a positive environmental impact and can also translate into significant cost savings for network operators. As cellular networks transition from fourth generation long term evolution (4G LTE) networks to fifth generation (5G) and beyond, the evolution towards denser network environments is expected to increase the opportunities for energy consumption savings.

Existing approaches to managing cell sleep states generally configure base stations to make state transition decisions locally, in order to transition a cell from an active state to a sleep state, or vice-versa. Base stations can be equipped with proprietary distributed sleep state management algorithms that manage local state transitions. However, such approaches risk noticeable network performance degradation. This is at least in part because if a cell enters sleeping mode, and if the sleep state management algorithm later decides that it is time to wake up that cell, it can take approximately five minutes for the sleeping cell to resume its normal operational state. In the event of a sudden increase in customer traffic, the cell will not be able to serve the high traffic demand for those five minutes. When multiple cells operate in this way, the resulting network performance impact can be severe.

To address the risk of network performance degradation, network equipment managers can be more cautious, e.g., by configuring base stations in a manner that reduces the likelihood that a cell will enter a sleep state and reduces the amount of time the cell will spend in a sleep state. However, more cautions configurations can lead to reduced energy savings. Better sleep state management approaches are needed to achieve improved energy savings without significant network performance impact.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
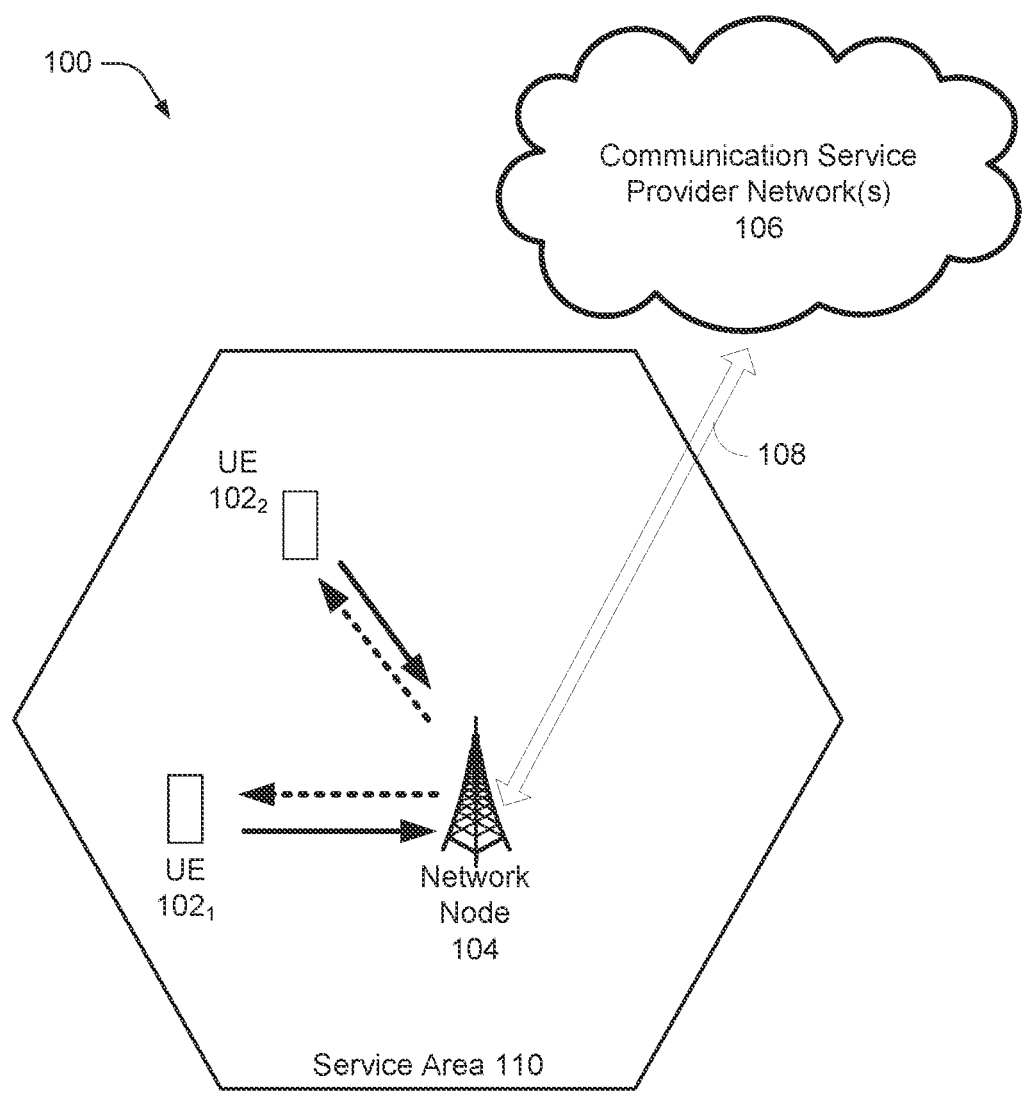
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards cellular communication network sleep management. A central network automation platform can control sleep settings deployed to radio access network nodes that support cells of the cellular communication network. The network automation platform can collect cell configuration data and can use the cell configuration data to determine which cells are sleep-eligible. The network automation platform can deploy a list of sleep feature activation parameters to the nodes that support sleep-eligible cells. Custom values for the sleep feature activation parameters, also referred to herein as sleep settings, can be determined for the sleep-eligible cells, and the sleep settings can be sent to the nodes that support the sleep-eligible cells, in order to manage transitions between sleep and active states, as appropriate for different sleep-eligible cells. The network automation platform can furthermore monitor performance of the sleep-eligible cells and neighbor cells to determine whether a cell's sleep settings have led to degraded performance. The network automation platform can modify a cell's sleep settings or a cell's sleep-eligible status in response to detecting degraded performance. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultramobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, also called sectors or service areas, such as service area 110, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
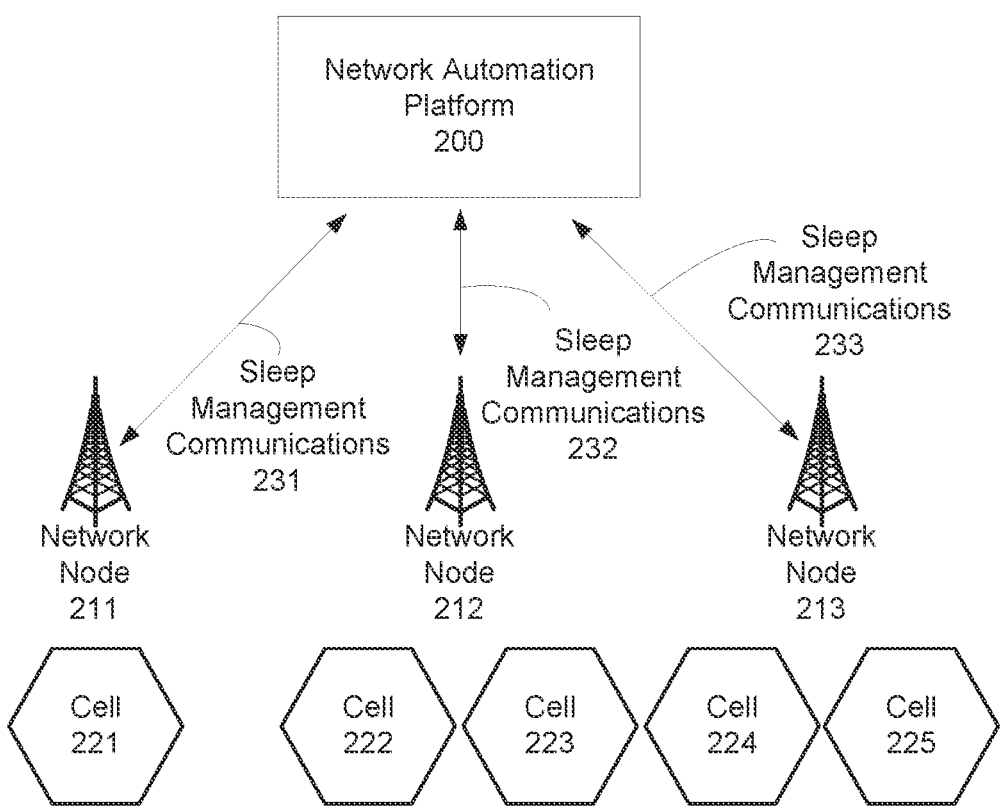
FIG. 2 illustrates example identification of sleep-eligible cells and configuration of sleep-eligible cells, in accordance with various aspects and embodiments of the subject disclosure.

FIG. 2 illustrates example identification of sleep-eligible cells and configuration of sleep-eligible cells, in accordance with various aspects and embodiments of the subject disclosure. FIG. 2 includes an example network automation platform 200, example network nodes 211, 212, and 213, and example cells 221, 222, 223, 224, and 225. Sleep management communications 231 are exchanged between network automation platform 200 and network node 211, sleep management communications 232 are exchanged between network automation platform 200 and network node 212, and sleep management communications 233 are exchanged between network automation platform 200 and network node 213.

In an example, the network automation platform 200 illustrated in FIG. 2 can be included in communication service provider network(s) 106 introduced in FIG. 1; network nodes 211, 212, and 213 can each implement a network node 104 introduced in FIG. 1; and cells 221, 222, 223, 224, and 225 are examples of a service area 110 introduced in FIG. 1. Network node 211 is illustrated as supporting one cell 221, while network nodes 212 and 213 are each illustrated as supporting multiple cells, namely, network node 212 supports cells 222 and 223, and network node 213 supports cells 224 and 225. While one-cell and two-cell network nodes are illustrated in FIG. 2, network nodes can optionally support additional cells, e.g., three or more cells in some embodiments.

When two or more cells serve an overlapping geographic area, whether or not the cells are supported by a same network node, one or more of the overlapping cells can be configured as a "coverage" cell, that is, a cell that provides a minimum requisite level of service in the geographic area, while one or more additional cells can be configured as "capacity" cells, namely, cells that provide additional service capacity in the geographic area. Capacity cells can provide extra network capacity to handle high network traffic conditions.

Fluctuating network traffic can result in fluctuating capacity cell requirements, with low-traffic conditions in a particular geographic area corresponding to reduced need for capacity cells to serve that area, and high-traffic conditions corresponding to increased need for capacity cells. In an example according to FIG. 2, cells 221, 222 and 224 are coverage cells, and cells 223 and 225 are capacity cells. Cell 223 can provide a capacity cell for coverage cell 222, and cell 223 can serve a geographic area that overlaps with cell 222. Similarly, cell 225 can provide a capacity cell for coverage cell 224. As such, capacity cells 223 and 225 can beneficially transition into sleep mode when capacity cells 223 and 225 are not needed, and capacity cells 223 and 225 can beneficially transition into active mode when capacity cells 223 and 225 are needed. The cell transitions between sleep mode and active mode can be managed according to embodiments of this disclosure.

Cells that serve adjoining geographic areas are referred to as neighbor cells. In an example based on FIG. 2, cells 222 and 223 can serve a same or overlapping geographic area, and cell 221 can serve a geographic area that adjoins the area served by cells 222 and 223. As such, cell 221 is a neighbor cell of cells 222 and 223. Similarly, cells 224 and 225 can serve a same or overlapping geographic area which adjoins the area served by cells 222 and 223. As such, cells 224 and 225 are also neighbor cells of cells 222 and 223. In practice, neighbor cells can also have some overlap, to allow handoffs from cells to neighbor cells as user equipment moves from one geographic area to another.

The terms "sleep state" and "sleep mode" as used herein refer to reduced energy states. Embodiments may vary in the amount of energy consumed in a sleep state, however, any state that is associated with a substantial drop in energy consumption, e.g., a 25% or larger drop in energy consumption, can be considered a sleep state for the purpose of this disclosure.

When a capacity cell such as 223 enters sleep mode, network traffic that would have been handled by the capacity cell 223 can instead be handled by coverage cell 222 or neighbor cells such as 221 and 224/225. Therefore, embodiments of this disclosure can monitor performance of capacity cell 223 and coverage cell 222, as well as performance of neighbor cells 221 and 224/225, to assess how sleep settings deployed to capacity cell 223 are impacting performance of the cellular communications network. Embodiments of this disclosure can detect degraded performance in cells configured with sleep settings, as well as degraded performance in neighbor cells, and can adjust cell sleep settings to avoid degraded performance.

In an example embodiment according to FIG. 2, sleep management communications 231 can include a first communication from network node 211 to network automation platform 200. The first communication can provide cell configuration settings for cells supported by network node 211, e.g., for cell 221, to network automation platform 200. One example cell configuration setting includes data indicating whether cell 221 is configured as a coverage cell or a capacity cell. Other example cell configuration settings can also be provided, e.g., as described further in connection with FIG. 5. Furthermore, additional cell data can be provided, such as cell load information and number of user equipment connections to the cell, as described in connection with FIG. 5. Sleep management communications 232 and 233, respectively, can similarly provide, to network automation platform 200, cell configuration settings and additional cell data for cells supported by network nodes 212 and 213, respectively.

Network automation platform 200 can be configured to analyze received cell configuration settings and any additional cell data to identify sleep-eligible cells. In an example according to FIG. 2, cells 223 and 225 are configured as capacity cells, and network automation platform 200 can identify cells 223 and 225 as sleep-eligible on the basis of their capacity cell configuration data. However, in some embodiments, network automation platform 200 can be configured to include further information, such as other cell configuration information and/or additional cell data, in connection with determinations regarding which cells are identified as sleep-eligible.

Network automation platform 200 can be configured to send sleep feature activation parameters, also referred to herein as "sleep parameters," to network nodes that support sleep-eligible cells. For example, in FIG. 2, sleep management communications 231 can include a second communication, comprising a communication from network automation platform 200 to nodes that support sleep-eligible cells, e.g., network nodes 212 and 213, which support sleep-eligible cells 223 and 225, respectively. The second communication can comprise a group of sleep parameters. Sleep parameters can identify conditions that are measured in connection with sleep mode determinations. For example, sleep parameters can include volume of network traffic being handled by a cell and/or neighbor cells, number of UE connections to a cell and/or neighbor cells, and time and calendar information such as time of day, day of week, and holiday information. Generally, sleep parameters can provide data that is correlated to current cell load and predicted future cell load. Upon receipt of the sleep parameters, network nodes 212 and 213 can configure the sleep-eligible cells 223 and 225 to monitor the sleep parameters.

Figure 3:
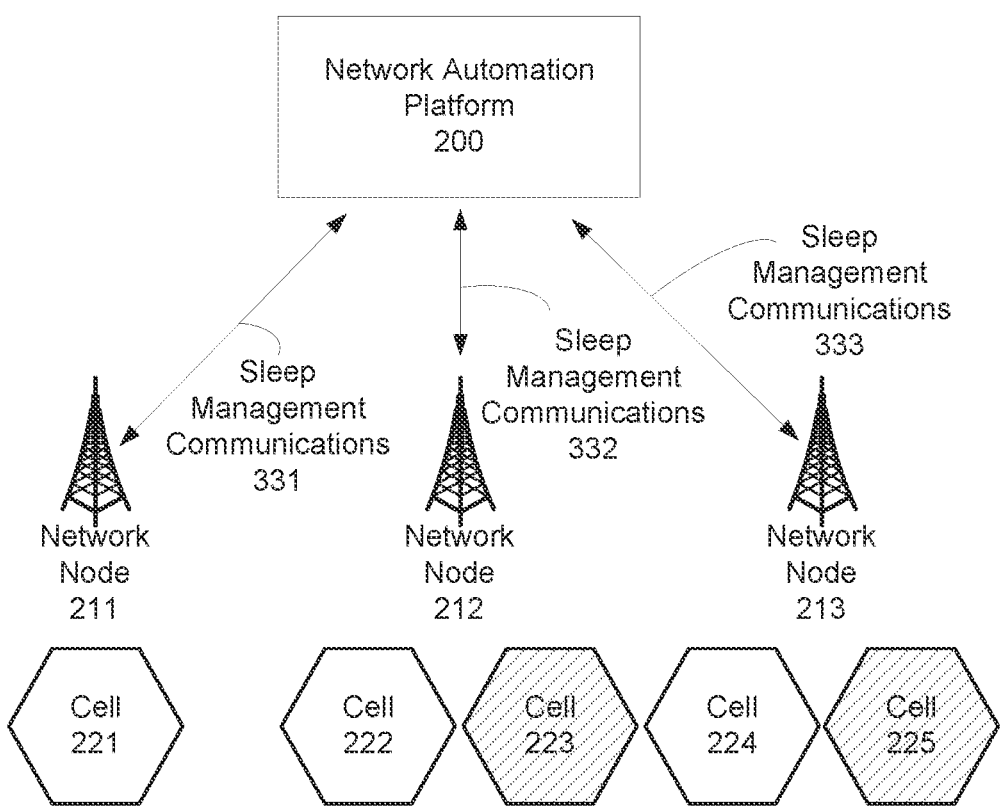
FIG. 3 illustrates example monitoring of sleep-eligible cells and updating sleep settings of sleep-eligible cells, in accordance with various aspects and embodiments of the subject disclosure.

FIG. 3 illustrates example monitoring of sleep-eligible cells and updating sleep settings of sleep-eligible cells, in accordance with various aspects and embodiments of the subject disclosure. FIG. 3 illustrates components introduced in FIG. 2, along with additional sleep management communications 331, 332, 333 between the network automation platform 200 and network nodes 211, 212 and 213. Cells 223 and 225 are shaded grey in FIG. 3 to indicate that cells 223 and 225 have been identified as sleep-eligible pursuant to operations described in connection with FIG. 2.

Network automation platform 200 can be configured to determine, e.g., based on cell configuration settings and additional data received pursuant to sleep management communications 232, 233, custom values for the sleep parameters at sleep-eligible cells 223, 225. These custom values may be referred to herein as "sleep settings". Sleep management communications 332, 333 can comprise sending, by the network automation platform 200, sleep settings to network nodes 212, 213. For example, network automation platform 200 can send sleep settings for cell 223 to node 212, and network automation platform 200 can send sleep settings for cell 225 to node 213.

In some embodiments, the sleep settings can comprise, for each sleep parameter, a "sleep threshold" value, and a "wake threshold" value. Nodes, e.g., example node 212, can be configured to transition a cell 223 to a sleep state when one or more of the cell's 223 sleep parameters have crossed (either by exceeding or falling below) their sleep threshold. Conversely, the node 212 can transition the cell 223 to an active state when one or more of the cell's 223 sleep parameters have crossed (either by exceeding or falling below) their wake threshold. Having received the sleep parameters and the sleep settings applicable to sleep-eligible cells, the node 212 is configured to control transitions of sleep-eligible cells, e.g., cell 223, according to the sleep settings. The network automation platform 200 can be configured to monitor performance of the cell 223, as well as cell 222 and neighbor cells 221 and 224/225, and optionally modify the sleep settings for cell 223 or discontinue the sleep-eligibility of cell 223 based on monitoring data.

Monitoring performance of sleep-eligible cells 223, 225 after configuring the sleep-eligible cells with sleep settings can comprise transmissions of cell monitoring data from network nodes 212, 213 to network automation platform 200. For example, sleep management communications 331, 332, and 333 can comprise cell monitoring data. Cell monitoring data can comprise, inter alia, "retainability" data, such as numbers of dropped calls and failed data transmissions, as well as "accessibility" data, such as numbers of blocked call attempts and blocked data transmissions. Cell monitoring data can further comprise virtually any cell performance data, e.g., throughput rate, handover information, and changes/rates of change of cell performance metrics.

Network automation platform 200 can be configured to process received cell monitoring data in order to identify degraded performance of a configured sleep-eligible cell, e.g., of cell 223. Network automation platform 200 can furthermore be configured to process received cell monitoring data in order to identify degraded performance of other cells supported at a same node as the sleep-eligible cell 223, e.g., degraded performance of cell 222. Network automation platform 200 can be further configured to process received cell monitoring data in order to identify degraded performance of neighbor cells of the sleep-eligible cell 223, e.g., degraded performance of neighbor cells 221 and 224/225. Degraded performance can comprise, e.g., reductions in retainability and/or accessibility of a cell, as measured by received monitoring data. The reductions can be "significant" reductions, e.g., as determined by comparison to a degradation criterion.

In some embodiments, network automation platform 200 can comprise a streaming performance data store configured to store a trailing time window of cell performance data, e.g., the previous thirty days of cell performance data. Cell performance data can comprise, e.g., specified performance indicators for a cell. Network automation platform 200 can monitor the performance of cells of the cellular communication network by comparing a current performance of a cell, e.g., a short trailing time window of cell performance, to a historic performance of the cell, e.g., a longer trailing time window of cell performance.

In response to detecting degraded performance, either of a sleep-eligible cell 223, or of another cell 222 sharing the network node 212 of the sleep-eligible cell 223, or of a neighbor cell 221, 224/225 of the sleep-eligible cell 223, the network automation platform 200 can be configured to remove the sleep-eligible cell 223 from the identified sleep-eligible cells. Network automation platform 200 can instruct the node 212 to discontinue use of sleep parameters and sleep settings in connection with cell 223, thereby configuring cell 223 to remain in an "always active" configuration, so the cell 223 does not transition into the sleep state. Alternatively, the network automation platform 200 can calculate new sleep settings for cell 223, and deploy the new sleep settings to cell 223, in order to address the degraded performance.

Figure 4:
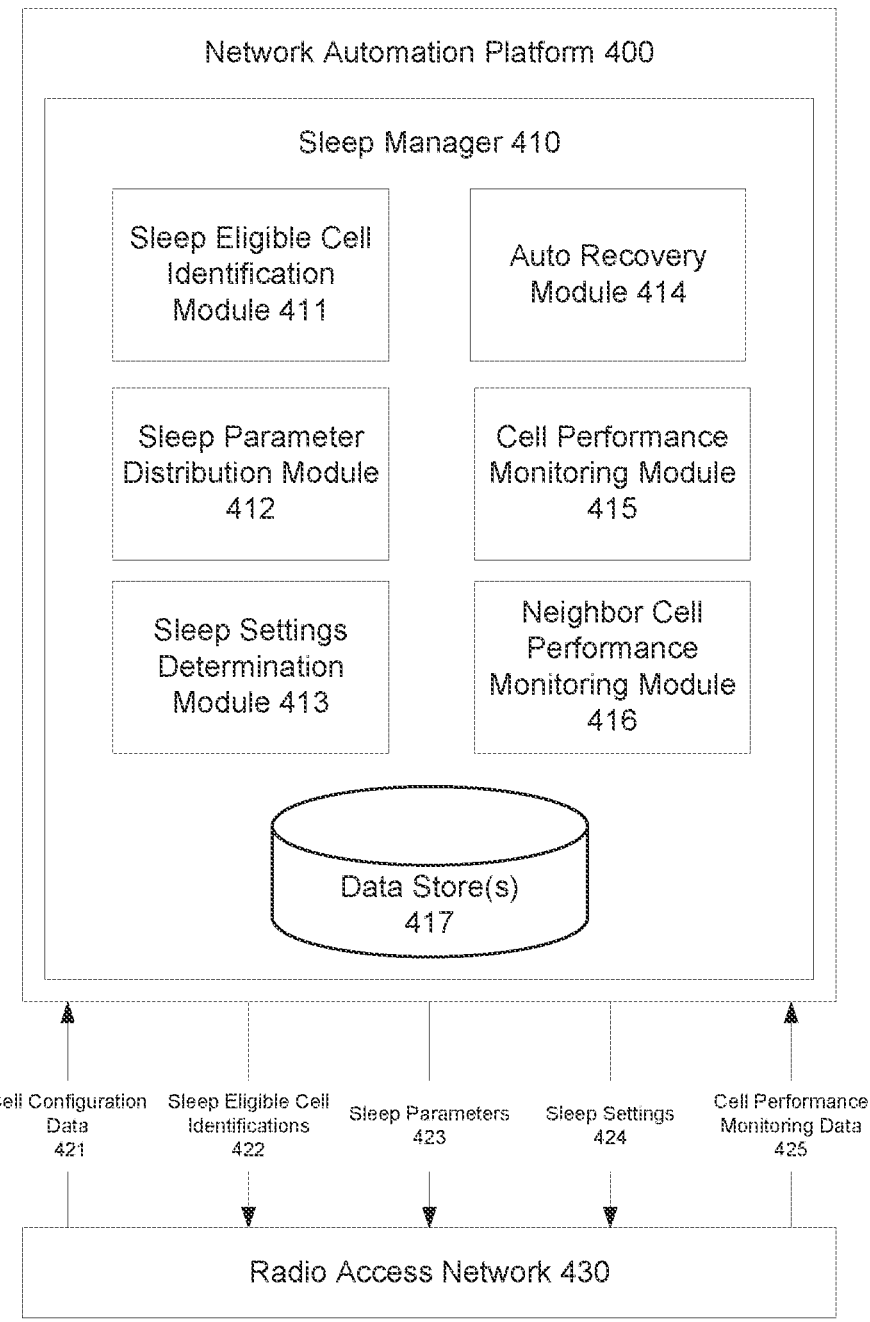
FIG. 4 illustrates example components of a network automation platform sleep manager, in accordance with various aspects and embodiments of the subject disclosure.
Figure 5:
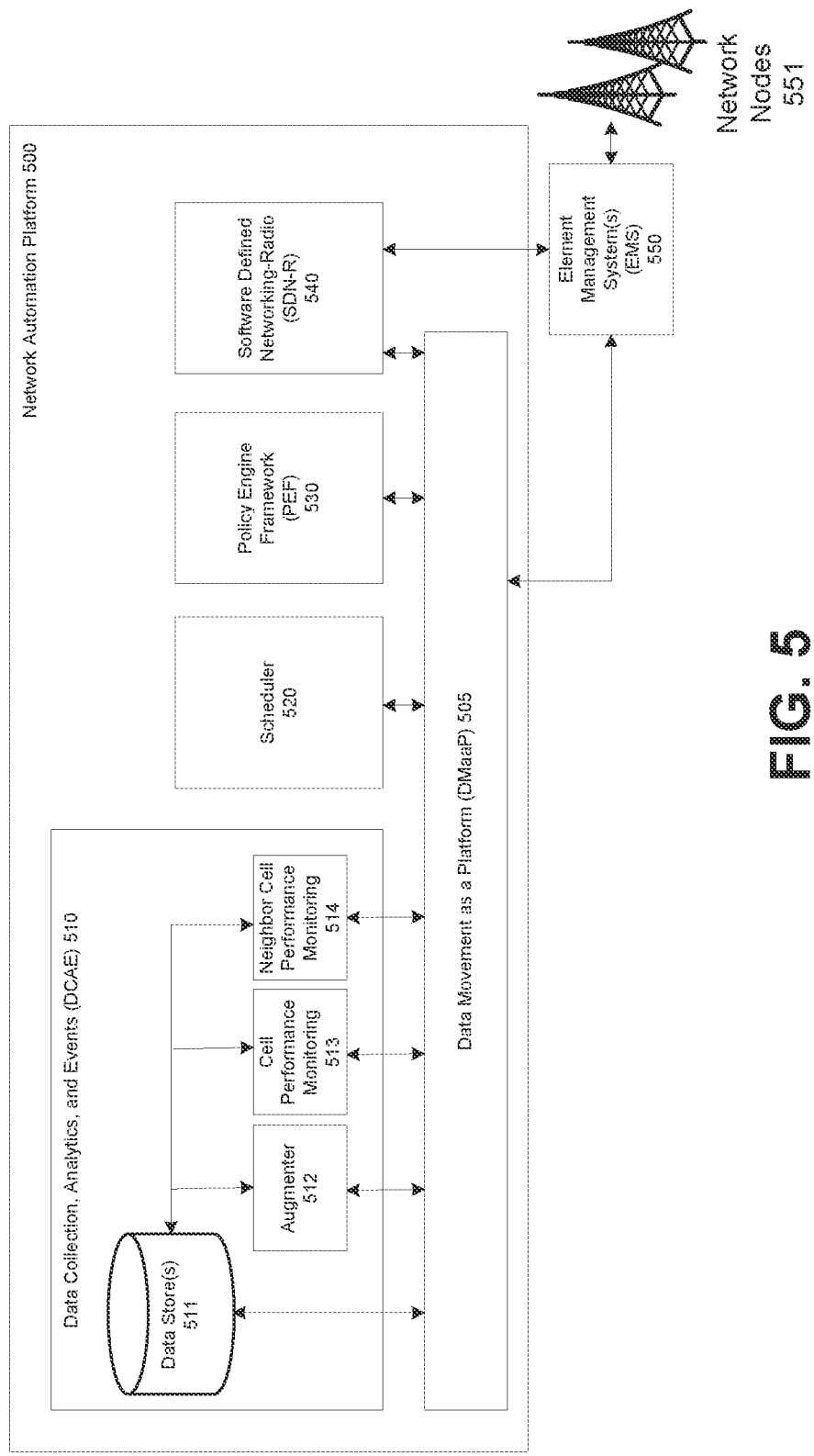
FIG. 5 illustrates an example embodiment of a network automation platform, in accordance with various aspects and embodiments of the subject disclosure.

FIG. 4 illustrates example components of a network automation platform sleep manager, in accordance with various aspects and embodiments of the subject disclosure. FIG. 4 illustrates a network automation platform 400 and a radio access network 430. The network automation platform 400 can implement a network automation platform 200 such as illustrated in FIG. 2 and FIG. 3. In some embodiments, the network automation platform 400 can be implemented according to an open network automation platform (ONAP) standard, for example, as illustrated in FIG. 5. The radio access network 430 can comprise network nodes such as network nodes 211, 212, and 213, illustrated in FIG. 2 and FIG. 3. As such, the radio access network 430 can comprise network nodes provided by one or more vendors, each vendor having an element management system (EMS) that can manage communications with the various vendor network nodes.

Example network automation platform 400 can include a sleep manager 410, along with other elements of a network automation platform not illustrated in FIG. 4. Sleep manager 410 includes sleep-eligible cell identification module 411, sleep parameter distribution module 412, sleep settings determination module 413, auto recovery module 414, cell performance monitoring module 415, neighbor cell performance monitoring module 416, and data store(s) 417. Functions performed by the illustrated components can be implemented in any network automation platform 400 architecture, e.g., in some embodiments, the illustrated functions may be included in an architecture such as illustrated in FIG. 5.

FIG. 4 also illustrates example communications between the network automation platform 400 and the radio access network 430. The example communications include cell configuration data 421, sleep-eligible cell identifications 422, sleep parameters 423, sleep settings 424, and cell performance monitoring data 425.

In example operations according to FIG. 4, the network automation platform 400 can receive cell configuration data 421. The network automation platform 400 can store the cell configuration data 421 in the data store(s) 417. The sleep-eligible cell identification module 411 can process the cell configuration data 421 to identify sleep-eligible cells. Sleep parameter distribution module 412 can provide sleep parameters 423 to nodes of the radio access network 430 that support the sleep-eligible cells. Sleep settings determination module 413 can determine sleep settings 424, e.g., sleep thresholds and wake thresholds, for the sleep parameters 423 at the sleep-eligible cells. Sleep settings 424 can furthermore comprise, or be accompanied by, times during which sleep-eligible cells are not permitted to be in a sleep state (or conversely, times during which an active state is required). The network automation platform 400 can provide respective sleep settings 424 to respective nodes of the radio access network 430 that support the respective sleep-eligible cells for which the sleep settings 424 were determined. The configured sleep-eligible cells can then proceed with sleep/wake transitions according to their respective sleep settings 424.

Network nodes of the radio access network 430 can be configured to send cell performance monitoring data 425 to the network automation platform 400. The network automation platform 400 can be configured to store the cell performance monitoring data 425 in data store(s) 417. The cell performance monitoring data 425 can be used by auto recovery module 414, cell performance monitoring module 415, and neighbor cell performance monitoring module 416.

Auto recovery module 414 can be configured to detect radio access network 430 conditions under which a cell sleep state should be overridden by triggering a transition to an active state. For example, large loads at neighbor cells may comprise a condition warranting waking a cell by auto recovery module 414.

Cell performance monitoring module 415 can be configured to monitor performance of a sleep-eligible cell during time periods wherein the sleep-eligible cell transitions into and out of sleep states. Neighbor cell performance monitoring module 416 can be configured to monitor performance of neighbor cells of a sleep-eligible cell during time periods wherein the sleep-eligible cell transitions into and out of sleep states. If performance of a sleep-eligible cell, or neighbors thereof, is determined to be affected by sleep transitions of the sleep-eligible cell, for example, if performance degrades according to a defined degradation criterion, then the sleep manager 410 can alter the sleep settings for the sleep-eligible cell, or revert the sleep-eligible cell to a non sleep-eligible state.

Sleep manager 410 can usefully employ machine learning to carry out many of the functions illustrated in FIG. 4. For example, machine learning can facilitate improved identification of sleep-eligible cells by sleep-eligible cell identification module 411, improved identification of appropriate parameters by sleep parameter distribution module 412, improved identification of appropriate sleep settings by sleep settings determination module 413, improved identification of conditions that should trigger waking cells by auto recovery module 414, and improved identification of degraded cell performance by cell performance monitoring module 415 and neighbor cell performance monitoring module 416.

FIG. 5 illustrates an example embodiment of a network automation platform, in accordance with various aspects and embodiments of the subject disclosure. The example network automation platform 500 can implement a network automation platform 200 in some embodiments. Furthermore, the example network automation platform 500 can include functions such as those illustrated in FIG. 4. The example network automation platform 500 implements an ONAP type network automation platform, wherein the components of the ONAP type network automation platform can be configured to incorporate functions such as those described in connection with FIG. 4.

The network automation platform 500 can include, inter alia, a Data Movement as a Platform (DMaaP) 505, a Data Collection, Analytics and Events (DCAE) 510, a scheduler 520, a Policy Engine Framework (PEF) 530, and a Software Defined Networking-Radio (SDN-R) 540. DCAE 510 can include data store(s) 511, augmenter 512, cell performance monitoring 513, and neighbor cell performance monitoring 514. The network automation platform 500 and components thereof can also include and/or interoperate with numerous other components not illustrated in FIG. 5, as will be appreciated.

The network automation platform 500 can manage network nodes 551 of a radio access network through Element Management System(s) (EMS) 550. Network nodes 551 can include, e.g., network nodes 211, 212, and 213, introduced in FIG. 2.

FIG. 5 provides ONAP-based operational capability that enables LTE, 5G, or other radio access network cells to sleep as often as preferable for energy consumption reduction, without imposing significant network performance degradation. This can be done by intelligently managing a functionality in the network nodes 550, which would allow cells thereof to sleep/wake up based on specific parameter settings provided by the network automation platform 500. In some embodiments according to FIG. 5, the network automation platform 500 can configure proprietary algorithms at network nodes 550 to use cell specific energy savings parameters, in a manner that increases potential energy savings without negatively impacting network performance or customer experience. Automated and cell-customized configuration of the sleep settings can be supported by use cases that leverage a network automation platform 500 according to FIG. 5.

In some examples, data store(s) 511 can comprise an inventory store, to store cell configuration information, and a cell performance data store, also referred to herein as a key performance indicator (KPI) data store, to store cell performance information. The KPI data store can comprise a streaming performance data store configured to store a trailing time window of cell performance data.

The network automation platform 500 can obtain latest configuration parameter information, as well as additional relevant element status for each of network nodes 551 and their supported cells, optionally via appropriate data collectors that interface with radio access network databases. The collected information can be stored in data store(s) 511 and can be consumed by various ONAP entities that leverage its functionality. Periodically (e.g. once per day, three times per week, or other time period), a list of radio access network cells and their energy-savings related parameters can be fetched into data store(s) 511. In other words, parameters associated with network nodes 551 and cell parameters can be fetched from any available source, e.g., from legacy mobility network databases, and upon reception at network automation platform 500, such data can be cached into a storage environment within the scope of the network automation platform 500, such as data store(s) 511.

In order to identify sleep-eligible cells, data in data store(s) 511 can optionally first be consumed by the augmenter 512. Augmenter 512 can comprise an analytics microservice which pre-processes the data fetched into data store(s) 511 and then provides pre-processed data to PEF 530. PEF 530 can be configured to make cell configuration decisions. PEF 530 can execute a decision-making logic to identify sleep-eligible cells, that is, cells that are candidates for sleep feature activation. The decision regarding which cells are candidates for sleep feature activation can be conveyed to the SDN-R 540, which can perform cell configuration via EMS 550.

The network automation platform 500 can configure cell energy savings parameters as follows. Upon identification of sleep-eligible cells, each sleep-eligible cell can be configured with sleep parameters, wherein the sleep parameters comprise specific parameters related to the sleep feature. The list of sleep parameters can be pre-determined, while values for the sleep parameters, referred to herein as sleep settings, can be decided by logic implemented across augmenter 512, PEF 530 and SDN-R 540.

In one example, to implement sleep settings, PEF 530 can send a consolidated message to SDN-R 540 regarding how SDN-R 540 can set the sleep parameters related to energy savings on a specific network node of network nodes 551, and cells across each sector of that specific network node. SDN-R 540 can securely connect to a corresponding EMS 550, e.g., via a RESTful interface, and SDN-R 540 can upload a configuration file with a set of parameters, including node-level and cell-level parameters. Upon configuration of a network node, SDN-R 540 can convey the result of configuration (success/failure) for each cell, by publishing the resulting configuration to DMaaP 505.

Monitoring performance of configured sleep-eligible cells can comprise, inter alia, post-configuration monitoring. Upon configuration of a network node, the network automation platform 500 can monitor the configured network node, and supported cells thereof, to evaluate whether the activated sleep function results in cellular network performance degradation. Monitoring can be initiated immediately upon successful configuration of a network node. During monitoring, a set of pre-specified cell-level key performance indicators (KPIs) for all cells of a network node can be monitored for a fixed configurable duration (e.g. eight hours, or other duration) by cell performance monitoring 513. Cell performance monitoring 513 can be configured as a microservice. Cell performance monitoring 513 can be configured to provide periodic updates via DMaaP 505, indicating whether the KPI-based performance is adequate, or whether it has degraded since the configuration by SDN-R 540 took place. In the event of a detected performance degradation, the PEF 530 can be configured to initiate a "rollback" operation, in which case, PEF 530 can instruct SDN-R 540 to perform such rollback, so that a network node reverts to previously configured parameters.

Monitoring performance of configured sleep-eligible cells can also optionally comprise post-sleep monitoring. In some examples, each configured sleep-eligible cell can be monitored starting when the cell goes to sleep for the first time after configuration. The monitoring can begin when the cell goes to sleep and can continues for a fixed, configurable duration, even if the cell wakes up during the monitoring window. This monitoring can use historical data obtained via DMaaP 505 and stored in, e.g., a KPI store within data store(s) 511. Neighbor cell performance monitoring 514 can evaluate whether cells in the immediate neighborhood of a sleeping cell are under-performing during the sleeping period of the cell under evaluation. Similarly, as with post-configuration monitoring, policy-based decisions can be made to address potential detected performance degradation based on the performance monitoring performed by neighbor cell performance monitoring 514.

Cell performance monitoring 513 and neighbor cell performance monitoring 514 can collect and analyze information from an inventory and a KPI store included in data store(s) 511, regarding the historical performance behavior of each sleep-eligible cell and its neighbor cells, during sleeping and non-sleeping mode. Based on this information, and via leveraging machine learning functionality, cell performance monitoring 513 and neighbor cell performance monitoring 514 can publish periodic events onto DMaaP 505, notifying PEF 530 and other components about any detected performance degradations in the neighborhood of a specific cell under assessment/monitoring. The event information can be consumed by PEF 530, which can further decide how to remediate a potential detected performance degradation. Such remediation can include rolling back to a previous configuration and/or recalculating sleep settings. PEF 530 decision-making logic for rollback can optionally be implemented and provisioned to the PEF 530 for execution at runtime.

The scheduler 520 can be configured to trigger sleep feature activation on a per network node basis. Scheduler 520 can be configured to dispatch configuration jobs at specific points in time, e.g., by publishing jobs on DMaaP 505. Scheduler 520 can be configured to dispatch jobs for a list of network nodes among network nodes 551, or for individual network nodes. Scheduler 520 can furthermore be configured to perform flow control on the jobs that it dispatches, based on monitoring of the rate at which jobs are executed and completed by SDN-R 540. The flow control logic and maximum degree of concurrency can be configurable. As an example, a new configuration job can be dispatched as soon as the previous job was completed. As another example, if the scheduler 520 dispatches a batch of jobs, e.g., ten jobs, it can wait until all are completed before it dispatches the next batch of jobs.

In some embodiments, the scheduler 520 can operate by periodically, i.e., x times per day (where x is configurable), at configurable specific time(s) of the day, obtaining a list of deployed network nodes from an inventory store included in data store(s) 511. For an example eNodeB network node, the obtained data can include, e.g, an eNodeB common ID (e.g. ARL01013), a submarket (e.g. "Maine", "Massachusetts", "Arkansas", etc.) to which the eNodeB belongs, and a local time zone where the eNodeB is deployed.

Using this information, the scheduler 520 is able to determine the time frame corresponding to the local maintenance window where the eNodeB is deployed; the maintenance window local start time can be, e.g., 00:00 and the local end time can be 06:00. An eNodeB can be scheduled for energy savings configuration changes during its local maintenance window. The scheduler 520 can be configured to decide the specific time at which the configuration job is initiated during the local maintenance window of the eNodeB.

The scheduler 520 can be configurable. Configurable aspects can include, e.g., the DMaaP 505 topics that scheduler 520 publishes and subscribes to; the frequency of obtaining information from the inventory; the frequency of executing periodic configurations; the maximum number of network nodes 551 for which configuration jobs can be issued and pending simultaneously, before issuing further configuration jobs, for each EMS; and the time duration that the scheduler 520 waits to receive a message indicating a recently scheduled job has been processed and completed (after this time duration, the scheduler 520 can "time-out", and issue the next configuration job. This prevents the scheduler 520 from waiting indefinitely for a configuration job to complete).

The scheduler 520 can be configured to interact with PEF 530, augmenter 512 and SDN-R 540 via DMaaP 505. For example, the scheduler 520 can dispatch network node configuration jobs to augmenter 512 via DMaaP 505. The scheduler 520 can also receive skip messages from augmenter 512 and/or PEF 530 so that scheduler 520 can dispatch a new network node configuration job. The scheduler 520 can receive completion messages from SDN-R 540 so that scheduler 520 can dispatch a new network node configuration job.

The augmenter 512 can be configured as a microservice that collects data from an inventory store of data store(s) 511. Collected data can comprise cell configuration data associated with a network node of network nodes 551, its sectors and its cells. The augmenter 512 can perform an initial filter to ensure that PEF 530 has the data it needs to make identification and configuration decisions. Moreover, augmenter 512 can perform a preliminary analysis on data needed by PEF 530 when executing the energy savings configuration decision algorithmic flow.

The PEF 530 can be configured to execute decision-making logic for energy savings configuration. More specifically, PEF 530 can obtain network node and cell configuration messages from augmenter 512; PEF 530 can evaluate the status of the network node and each cell; and PEF 530 can make a decision regarding whether any energy-savings related configuration parameter changes need to be made, for a network node or any of its cells.

In some examples, PEF 530 can skip a network node (i.e., it does not proceed with configuration or does not include cells of a network node among sleep-eligible cells) under various circumstances, including, e.g.: if no changes need to be made in a current network node configuration or the configuration of its cells; if the energy savings feature on a network node should not be activated, based on the fact that the network node is not a candidate for energy savings; if PEF 530 identifies that crucial network node or cell information (needed for evaluating the candidacy of the network node or cells for energy savings) is missing in the message from augmenter 512; and/or if a network node is marked as "blacklisted"; if a network node is marked as "in maintenance".

PEF 530 can be configured to set a timeout period, e.g., ten minutes, for cell configuration, which begins when PEF 530 publishes a cell sleep configuration instruction to DMaaP 505. After the timeout period, if PEF 530 has not yet received any response back from SDN-R 540 about configuration results, PEF 530 can interrupt and publish a notification indicating the failure.

In some embodiments, PEF 530 can be configured to identify, or "tag" cells which are not sleep-eligible. In one example, PEF 530 can tag sectors of cells as Applicable, Not Applicable, or Issue-Resolve, wherein cells in "Applicable" sectors are sleep-eligible. PEF 530 can furthermore tag cells as Coverage, Capacity, or Not Applicable, where, for example, "Capacity" cells are sleep-eligible. PEF 530 can furthermore determine energy savings parameter values for each sleep-eligible cell.

PEF 530 can be configured to create a consolidated message and send it to SDN-R 540. The message can contain the energy savings parameter values (i.e., the sleep settings) that are to be changed for a network node and/or its cells. Energy savings parameters that are to remain unchanged can be set to "not changed"). The message can be sent to SDN-R 540 when PEF 530 determines that to network node has cells that are candidates for energy savings. PEF 530 can publish a configuration instruction to DMaaP 505, so that SDN-R 540 can obtain and execute the intended configuration.

PEF 530 can obtain periodic events from cell performance monitoring 513 and neighbor cell performance monitoring 514 (referred to collectively as performance monitoring 513/514), regarding post-configuration monitoring results. If performance monitoring 513/514 publishes an event for a network node with degraded performance, PEF 530 can receive the message and instruct SDN-R 540 to revert the network node configuration to a previous configuration. If performance monitoring 513/514 publishes an event including multiple co-located network nodes with degraded performance, PEF 530 can receive the message for each of co-located network nodes and instruct SDN-R 540 to rollback each of them. If performance monitoring 513/514 publishes an event that indicates performance degradation in the neighborhood of a sleeping cell, PEF 530 can receive the message and instruct SDN-R 540 to revert/rollback the cell configuration.

In some embodiments, performance monitoring 513/514 can be triggered by a monitoring trigger microservice. The monitoring trigger microservice can ensure that performance monitoring 513/514 monitors (a) a network node's cells that were recently configured by SDN-R 540 for the activated energy saving feature and (b) the cells that were previously configured by SDN-R 540 for the cell-sleep feature and have entered sleep mode. Given the large number of cells in today's networks, cells that do not need to be monitored can be filtered out. The trigger microservice can send trigger messages to performance monitoring 513/514 in order to kickoff monitoring after cell configuration takes place.

Performance monitoring 513/514 can be responsible for monitoring a set of predefined KPIs and/or performance counters for a network element that is provided to performance monitoring 513/514 as input, as well as for monitoring a set of neighboring elements of the same type. Within the context of the cell energy-savings use case, there can be two instances of performance monitoring: a first instance can monitor KPIs and counters during the post-configuration phase, and a second instance can monitor the post-sleep phases. Cell performance monitoring 513 can monitor a cell, and neighbor cell performance monitoring 514 can monitor a pre-defined cell neighborhood. The neighborhood being monitored can include, e.g., cells in a same location as a monitored sleep-eligible cell. Alternatively, the neighborhood can include cells within predefined distance from a monitored sleep-eligible cell, e.g., cells within a two mile radius.

In some embodiments, performance monitoring 513/514 can be configured to conduct a time series decomposition algorithm to detect anomalies (or performance degradation) in a trailing time window (e.g., the past three hours, or other configurable duration) on a per-cell-per-KPI basis, in comparison to a baseline of a longer trailing time window, such as thirty days.

The time series decomposition can obtain a secular trend within a specified seasonality window W, through smoothing over long term (multiples of W), i.e., by centered moving average. The seasonal trend can be obtained by averaging the phase value (after removing secular trend) across seasons, i.e., by seasonal moving average. The remainder can comprise a noise component, and noise components can be modeled, e.g., as zero-mean Gaussian variables with different variance. A time series value can be identified as anomalous if the noise components exceed an identified critical value. If anomalous behavior, i.e., performance degradation is detected, then performance monitoring 513/514 can notify PEF 530.

An example time series decomposition algorithm is described below, understanding that the algorithm can be modified or replaced by other algorithms in some embodiments.

Performance monitoring 513/514 can conduct a time series decomposition algorithm to detect anomalies in, e.g., the past three hours on the per-cell-per-KPI basis based on a thirty day history. At a high level, time series decomposition algorithm de-constructs a given time series into the secular trend component ({Tt}), the seasonal component ({St}), and the noise component ({Nt}). In the additive model, the original time series ({Vt}) is the summation of these three components.

The general idea of time series decomposition can be the following. With a specified seasonality window W, secular trend can be obtained through smoothing over long term (multiples of W), i.e., by centered moving average:

$$S_t = \sum_{i=0}^{K} V_{t-iW} - T_{t-iW}$$

The seasonal trend can be obtained by averaging the phase value (after removing secular trend) across seasons, i.e., by seasonal moving average:

$$S_t = \sum_{i=0}^{K} V_{t-iW} - T_{t-iW}$$

Where K is the number of seasonal windows contained in the historical data. And the remainder becomes the noise component:

$$N_t = V_t - T_t - S_t$$

We further model the noise components, Nt, at different phase as zero-mean Gaussian variables with different variance, where the phase t|W represents t mod W. We tag the corresponding time series value, Vt, as anomalous (critical value 1.96 at 95% confidence interval) if:

$$|N_t/\sigma_{t|w}| > 1.96$$

Performance monitoring 513/514 can summarize the anomaly results on the per-node-per-KPI basis from the previous step, into a binary answer, and can send the binary answer to PEF 530.

Upon detecting degraded performance, performance monitoring 513/514 can send, e.g., a "performance-degraded=yes" event to DMaaP 505. In response, PEF 530 can optionally reconfigure sleep settings for all the cells in the sector of the cell that is under monitoring. PEF 530 can optionally reconfigure cells as soon as the first such message is sent by performance monitoring 513/514.

Figure 6:
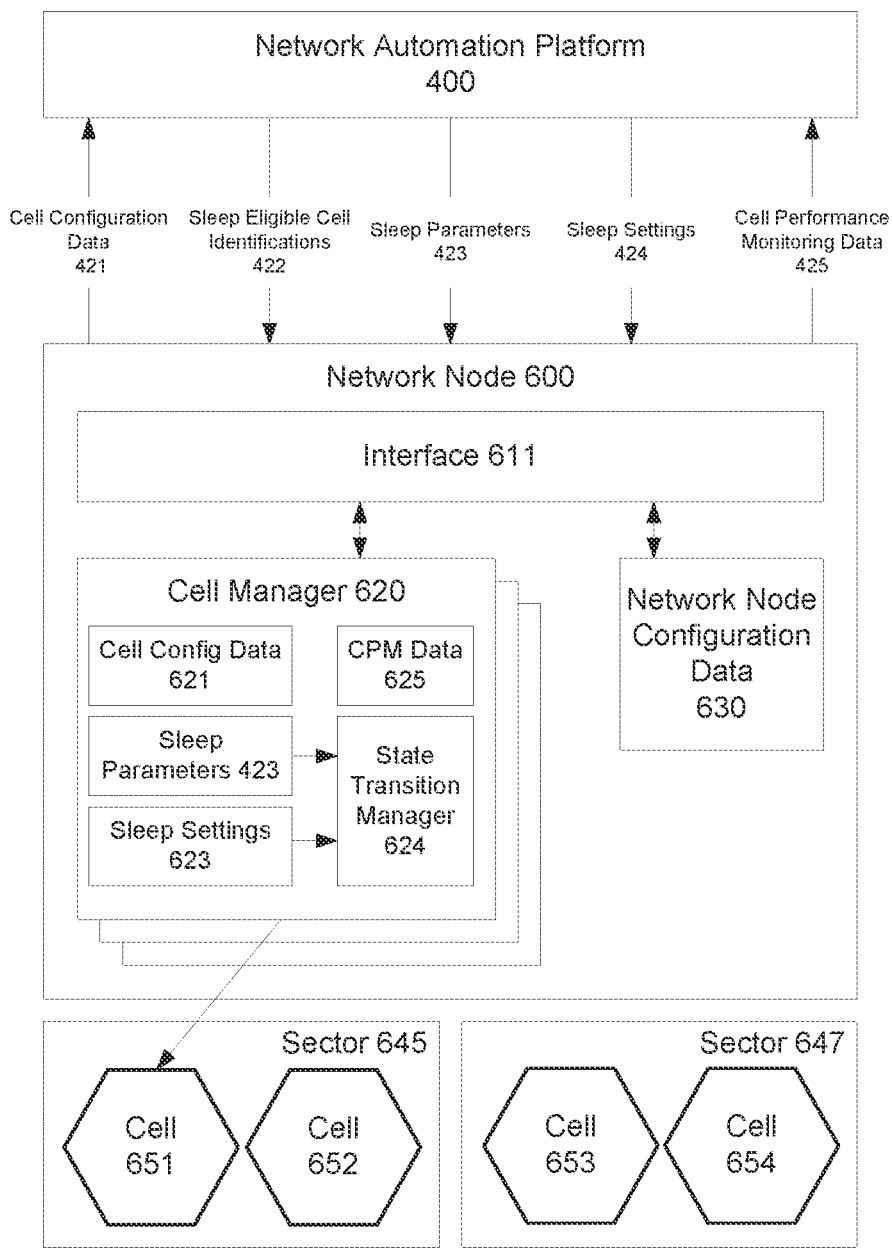
FIG. 6 illustrates an example radio access network node, in accordance with various aspects and embodiments of the subject disclosure.

FIG. 6 illustrates an example radio access network node, in accordance with various aspects and embodiments of the subject disclosure. Example network node 600 can implement, e.g., a network node 211, 212, or 213 introduced in FIG. 2, and network node 600 can be included in a radio access network 430 such as illustrated in FIG. 4. Example network node 600 includes various components to implement features of this disclosure, however, numerous other components can be included in other embodiments, and the illustrated components can be incorporated into other components of a network node as can be appreciated.

Example network node 600 includes an interface 611, cell managers, including example cell manager 620, and network node configuration data 630. The example cell manager 620 includes cell configuration data 621, sleep parameters 423, sleep settings 623, cell performance monitoring (CPM) data 625, and state transition manager 624.

FIG. 6 furthermore illustrates multiple cells, including cells 651, 652, 653, and 654. The cells 651-654 are divided into two example sectors 645, 647. The network node 600 can communicate with a network automation platform 400, introduced in FIG. 4, by sending and receiving communications 421, 422, 423, 424, and 425, introduced in FIG. 4.

In FIG. 6, the example cell manager 620 can manage cell 651, and other similar cell managers can manage other cells 652-654. In response to a request from the network automation platform 400, the network node 600 can collect cell configuration data 621, along with other cell configuration data for the other cells 652-654, and optionally along with network node configuration data 630, and the network node 600 can include cell configuration data for the cells 651-654, and optionally network node configuration data 630, in cell configuration data 421 that is provided to the network automation platform 400. In other embodiments, the network automation platform 400 can collect cell configuration data 421 from other sources, e.g., from databases that may already collect the cell configuration data 421, and network automation platform 400 need not collect the data directly from the network node 600.

Subsequent to receipt of sleep-eligible cell identifications 422 and sleep parameters 423, the network node 600 can provide the sleep parameters 423 to cell managers for identified sleep-eligible cells. In an example, cell 651 can comprise a sleep-eligible cell, and so sleep parameters 423 can be provided to cell manager 620. The network node 600 can furthermore provide sleep settings 623 to the cell manager 620. Sleep settings 623 can comprise the sleep settings for cell 651, and, in embodiments wherein sleep settings 424 include sleep settings for multiple cells 651-654, the network node 600 can extract sleep settings 623 from the received sleep settings 424.

The state transition manager 624 can use sleep parameters 423 and sleep settings 623 to manage energy state transitions of the cell 651. For example, in response to one or more parameters of sleep parameters 423 crossing sleep threshold(s) indicated in sleep settings 623, the state transition manager 624 can transition the cell 651 into sleep mode. Conversely, in response to one or more parameters of sleep parameters 423 crossing wake threshold(s) indicated in sleep settings 623, the state transition manager 624 can transition the cell 651 into active mode.

The cell manager 620 can collect cell performance monitoring data 625. The network node 600 can be configured to send cell performance monitoring data 625, along with other cell performance monitoring data corresponding to other cells 652-654, to network automation platform 400, as cell performance monitoring data 425. In the event that sleep settings 623 are modified by network automation platform 400 in view of cell performance monitoring data 625, the network node 600 can provide the modified sleep settings to the cell manager 620, for use in place of sleep settings 623. In the event that cell 651 is removed from the group of sleep-eligible cells by the network automation platform 400, the network node 600 can configure sleep settings 623 and/or state transition manager 624 to discontinue transitions into sleep mode.

Figure 7:
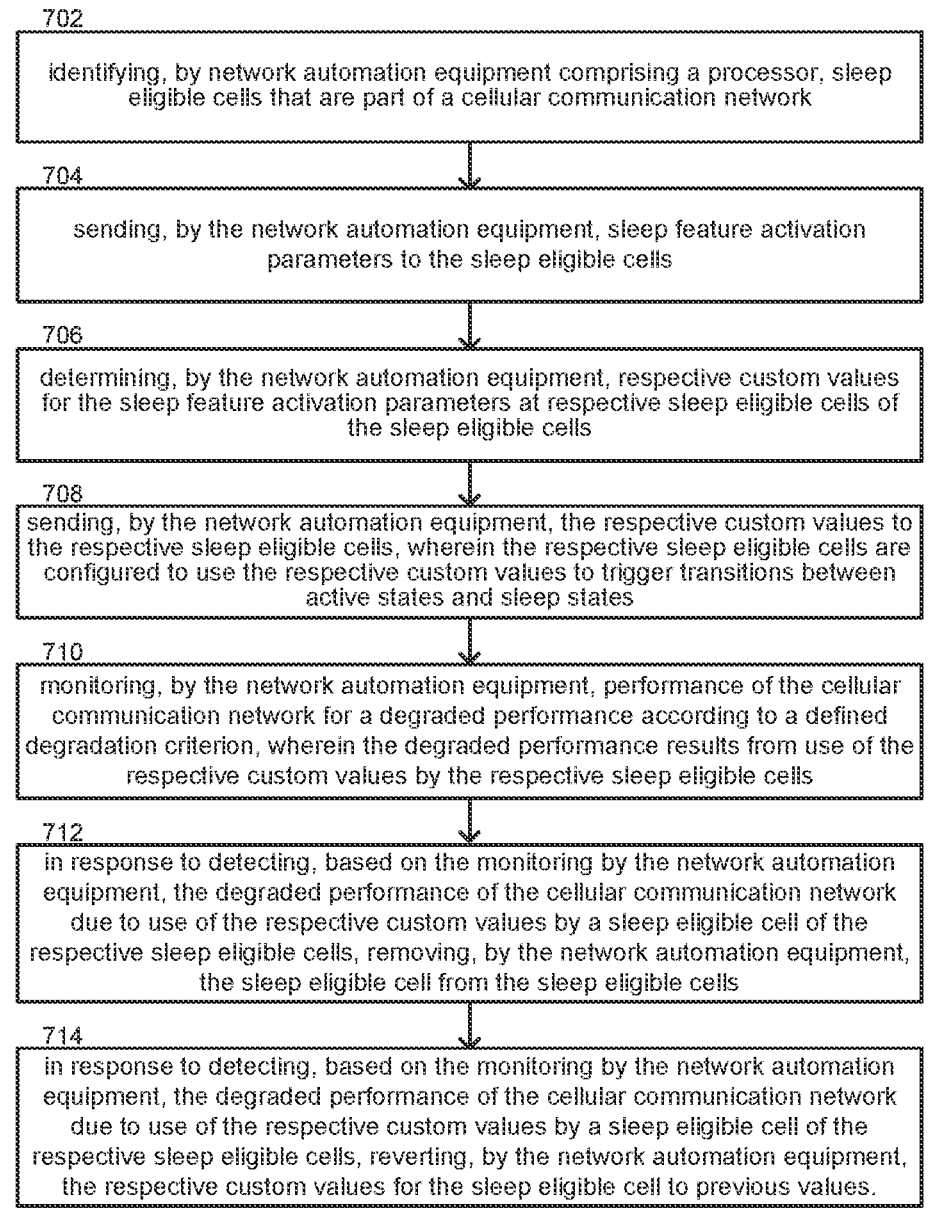
FIG. 7 is a flow diagram representing example operations of network automation equipment, in accordance with various aspects and embodiments of the subject disclosure.

FIG. 7 is a flow diagram representing example operations of network automation equipment, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by a network automation platform 400, illustrated in FIG. 4. Example operation 702 comprises identifying, by network automation equipment comprising a processor, sleep-eligible cells that are part of a cellular communication network. The cellular communication network can comprise radio access network 430. The sleep-eligible cells can comprise, e.g., capacity cells that provide additional capacity for the cellular communication network 430, and the sleep-eligible cells can exclude coverage cells that establish coverage for communications enabled via the cellular communication network 430.

Example operation 704 comprises sending, by the network automation equipment, sleep feature activation parameters 423 to the sleep-eligible cells. Example operation 706 comprises determining, by the network automation equipment, respective custom values for the sleep feature activation parameters at respective sleep-eligible cells of the sleep-eligible cells. The custom values are also referred to herein as sleep settings 424, and sleep settings 424 can comprise sleep threshold values and wake threshold values, as described herein. Example operation 708 comprises sending, by the network automation equipment, the respective custom values 424 to the respective sleep-eligible cells, wherein the respective sleep-eligible cells are configured to use the respective custom values 424 to trigger transitions between active states and sleep states.

Example operation 710 comprises monitoring, by the network automation equipment, performance of the cellular communication network 430 for a degraded performance according to a defined degradation criterion, wherein the degraded performance results from use of the respective custom values 424 by the respective sleep-eligible cells. Example operation 712 comprises, in response to detecting, based on the monitoring by the network automation equipment, the degraded performance of the cellular communication network 430 due to use of the respective custom values 424 by a sleep-eligible cell of the respective sleep-eligible cells, removing, by the network automation equipment, the sleep-eligible cell from the sleep-eligible cells. Example operation 714 comprises, in response to detecting, based on the monitoring by the network automation equipment, the degraded performance of the cellular communication network 430 due to use of the respective custom values by a sleep-eligible cell of the respective sleep-eligible cells, reverting, by the network automation equipment, the respective custom values for the sleep-eligible cell to previous values.

In some embodiments, monitoring the performance of the cellular communication network 430 can comprise monitoring the performance of a cell that shares network node equipment with at least one of the respective sleep-eligible cells. Monitoring the performance of the cell can comprise monitoring specified performance indicators, e.g., KPIs, for the cell. In some embodiments, monitoring the performance of the cellular communication network 430 can comprise monitoring the performance of all cells that share the network node equipment with the at least one of the respective sleep-eligible cells.

Furthermore, in some embodiments, monitoring the performance of the cell can be initiated after configuration of the at least one of the respective sleep-eligible cells to use the respective custom values, and monitoring the performance of the cell can be conducted for a specified time duration.

In another aspect, monitoring the performance of the cellular communication network 430 can comprise monitoring the performance of a neighbor cell that neighbors at least one of the respective sleep-eligible cells. Also, monitoring the performance of the cellular communication network 430 can comprise comparing a current performance of a cell of the cellular communication network 430 to a historic performance of the cell. The historic performance of the cell can be stored in a streaming performance data store configured to store a trailing time window of performance data.

Figure 8:
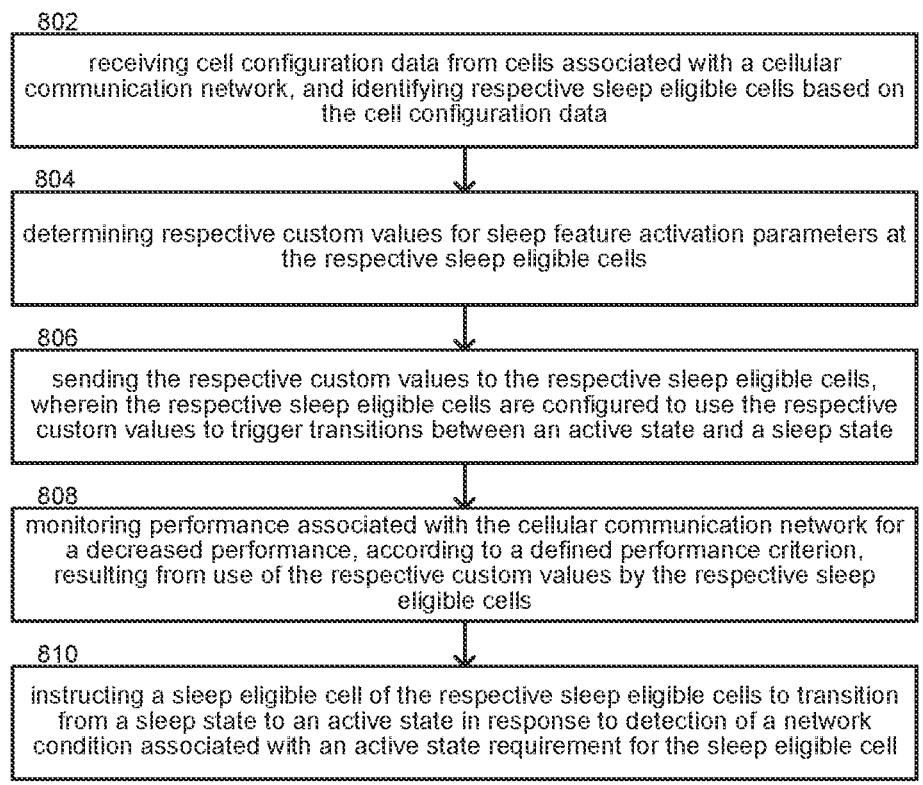
FIG. 8 is a flow diagram representing example operations of network automation equipment, in accordance with various aspects and embodiments of the subject disclosure.

FIG. 8 is a flow diagram representing example operations of network automation equipment, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by a network automation platform 400, illustrated in FIG. 4. Example operation 802 comprises receiving cell configuration data 421 from cells associated with a cellular communication network, and identifying respective sleep-eligible cells based on the cell configuration data. The cellular communication network can comprise, e.g., the radio access network 430. Example operation 804 comprises determining respective custom values, namely, sleep settings 424, for sleep feature activation parameters at the respective sleep-eligible cells. Example operation 806 comprises sending the respective custom values 424 to the respective sleep-eligible cells, wherein the respective sleep-eligible cells are configured to use the respective custom values 424 to trigger transitions between an active state and a sleep state.

Example operation 808 comprises monitoring performance associated with the cellular communication network 430 for a decreased performance, according to a defined performance criterion, resulting from use of the respective custom values 424 by the respective sleep-eligible cells. In some embodiments, monitoring the performance associated with the cellular communication network 430 can comprise monitoring the performance of a neighbor cell that neighbors at least one of the respective sleep-eligible cells. In some embodiments, monitoring the performance of the neighbor cell can comprise, e.g., monitoring a throughput rate associated with the neighbor cell, or a number of dropped calls or blocked calls at the neighbor cell.

Example operation 810 comprises instructing a sleep-eligible cell of the respective sleep-eligible cells to transition from a sleep state to an active state in response to detection of a network condition associated with an active state requirement for the sleep-eligible cell. For example, operation 808 can override a sleep determination made at a network node, by instructing the network node, or a cell supported at the network node, to return to an active state.

Figure 9:
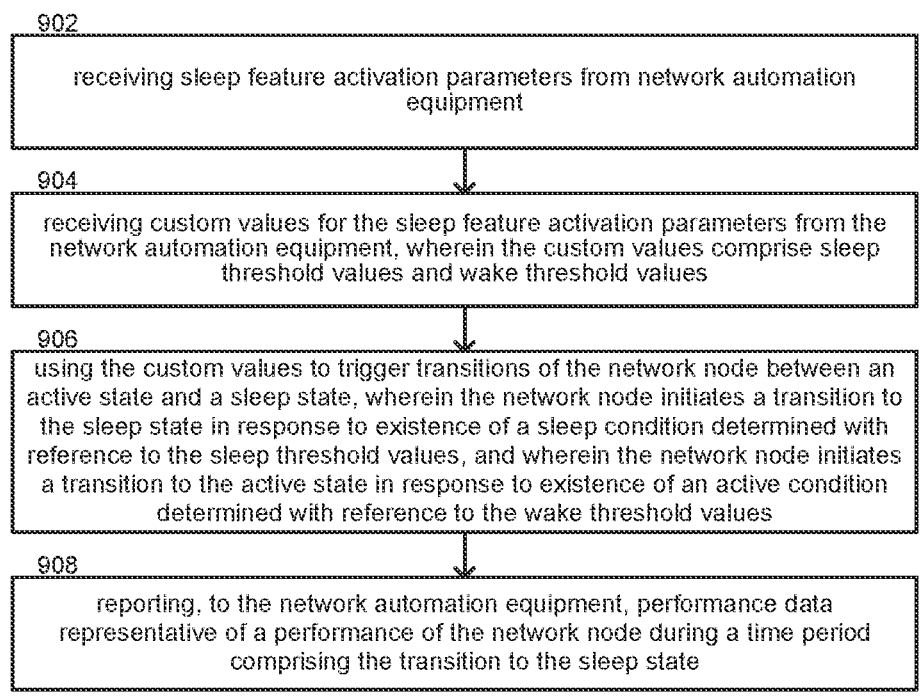
FIG. 9 is a flow diagram representing example operations of network node equipment, in accordance with various aspects and embodiments of the subject disclosure.

FIG. 9 is a flow diagram representing example operations of network node equipment, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by a network node 600, illustrated in FIG. 6. Example operation 902 comprises receiving sleep feature activation parameters 423 from network automation equipment, e.g., equipment at network automation platform 400. Example operation 904 comprises receiving custom values, namely, sleep settings 424, for the sleep feature activation parameters 423 from the network automation equipment 400, wherein the custom values 424 comprise sleep threshold values and wake threshold values. The custom values 424 for the sleep feature activation parameters 423 can be for a cell 651 supported by the network node 600, and the transition to the sleep state and the transition to the active state can comprise the transitions to the sleep state of the cell 651 and the transition to the active state of the cell 651.

Example operation 906 comprises using the custom values 424 to trigger transitions of the network node 600 between an active state and a sleep state, wherein the network node 600 initiates a transition to the sleep state in response to existence of a sleep condition determined with reference to the sleep threshold values, and wherein the network node 600 initiates a transition to the active state in response to existence of an active condition determined with reference to the wake threshold values. In some embodiments, energy state transitions of the network node 600 can comprise, e.g., an energy state transition of cell 651. Example operation 908 comprises reporting, to the network automation equipment 400, performance data, e.g., CPM data 625, representative of a performance of the network node 600 during a time period comprising the transition to the sleep state.

Figure 10:
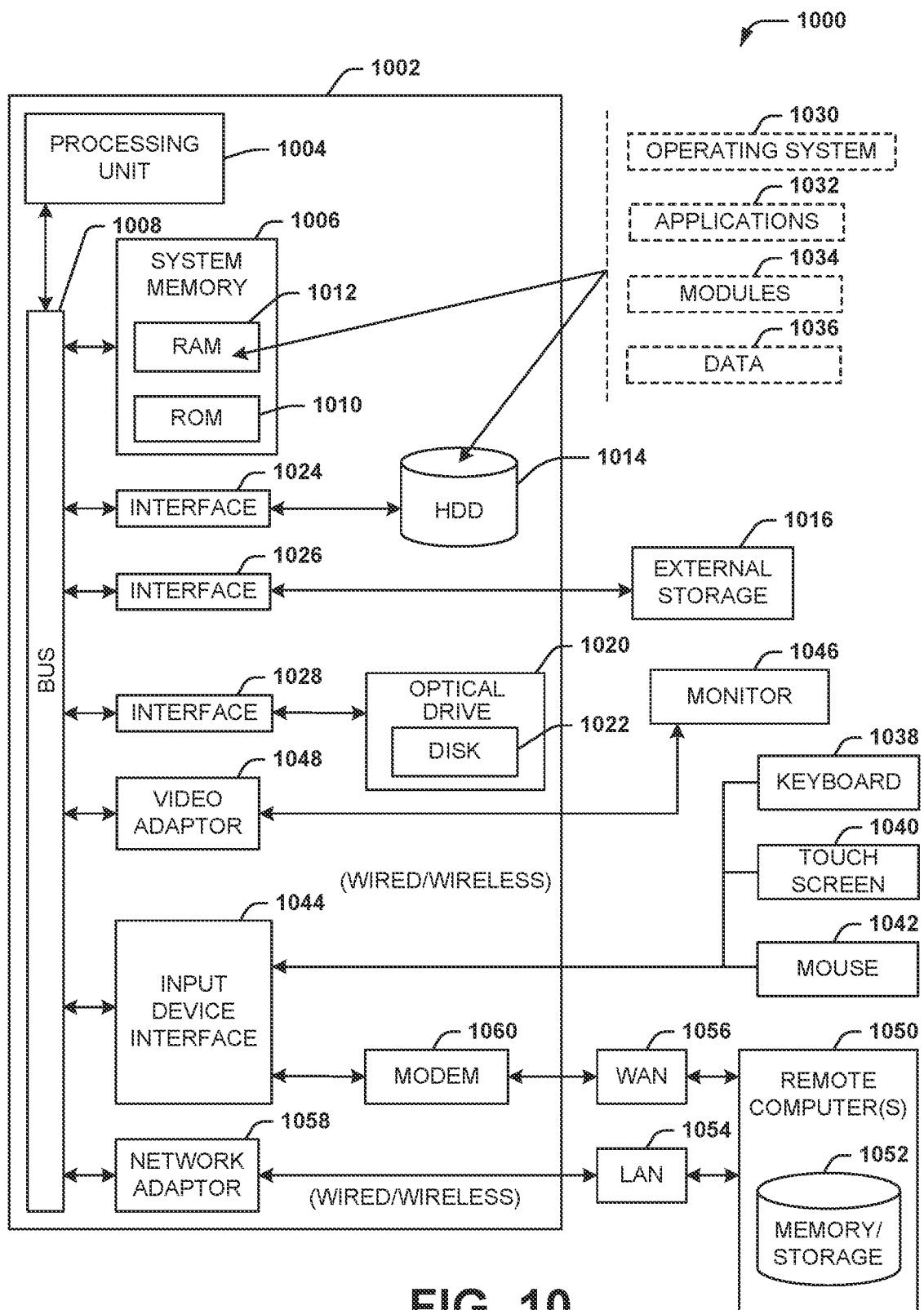
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    identifying, by network automation equipment comprising a processor, sleep-eligible cells that are part of a cellular communication network;
    sending, by the network automation equipment, sleep feature activation parameters to the sleep-eligible cells;
    determining, by the network automation equipment, respective custom values for the sleep feature activation parameters at respective sleep-eligible cells of the sleep-eligible cells;
    sending, by the network automation equipment, the respective custom values to the respective sleep-eligible cells, wherein the respective sleep-eligible cells are configured to use the respective custom values to trigger transitions between active states and sleep states; and
    monitoring, by the network automation equipment, performance of the cellular communication network for a degraded performance according to a defined degradation criterion, wherein the degraded performance results from use of the respective custom values by the respective sleep-eligible cells.

2. The method of claim 1, wherein the respective custom values comprise sleep threshold values and wake threshold values.

3. The method of claim 1, further comprising, in response to detecting, based on the monitoring by the network automation equipment, the degraded performance of the cellular communication network due to use of the respective custom values by a sleep-eligible cell of the respective sleep-eligible cells, removing, by the network automation equipment, the sleep-eligible cell from the sleep-eligible cells.

4. The method of claim 1, further comprising, in response to detecting, based on the monitoring by the network automation equipment, the degraded performance of the cellular communication network due to use of the respective custom values by a sleep-eligible cell of the respective sleep-eligible cells, reverting, by the network automation equipment, the respective custom values for the sleep-eligible cell to previous values.

5. The method of claim 1, wherein monitoring the performance of the cellular communication network comprises monitoring the performance of a cell that shares network node equipment with at least one of the respective sleep-eligible cells.

6. The method of claim 5, wherein monitoring the performance of the cell comprises monitoring specified performance indicators for the cell.

7. The method of claim 5, wherein monitoring the performance of the cellular communication network comprises monitoring the performance of all cells that share the network node equipment with the at least one of the respective sleep-eligible cells.

8. The method of claim 5, wherein monitoring the performance of the cell is initiated after configuration of the at least one of the respective sleep-eligible cells to use the respective custom values, and wherein monitoring the performance of the cell is conducted for a specified time duration.

9. The method of claim 1, wherein monitoring the performance of the cellular communication network comprises monitoring the performance of a neighbor cell that neighbors at least one of the respective sleep-eligible cells.

10. The method of claim 1, wherein monitoring the performance of the cellular communication network comprises comparing a current performance of a cell of the cellular communication network to a historic performance of the cell.

11. The method of claim 10, wherein the historic performance of the cell is stored in a streaming performance data store configured to store a trailing time window of performance data.

12. The method of claim 1, wherein the sleep-eligible cells comprise capacity cells that provide additional capacity for the cellular communication network, and wherein the sleep-eligible cells exclude coverage cells that establish coverage for communications enabled via the cellular communication network.

13. Network automation equipment, comprising:
a processor; and
a memory that stores executable instructions that, when executed by the processor, facilitate performance of operations, comprising:
sending sleep feature activation parameters to sleep-eligible cells associated with a cellular communication network;
determining respective custom values for the sleep feature activation parameters at respective sleep-eligible cells of the sleep eligible cells;
sending the respective custom values to the respective sleep-eligible cells, wherein the respective sleep-eligible cells are configured to use the respective custom values to trigger transitions between an active state and a sleep state; and
monitoring performance associated with the cellular communication network for a decreased performance, according to a defined performance criterion, resulting from use of the respective custom values by the respective sleep-eligible cells.

14. The network automation equipment of claim 13, wherein the operations further comprise receiving cell configuration data from cells associated with the cellular communication network, and identifying the respective sleep-eligible cells based on the cell configuration data.

15. The network automation equipment of claim 13, wherein the operations further comprise instructing a sleep-eligible cell of the respective sleep-eligible cells to transition from the sleep state to the active state in response to detection of a network condition associated with an active state requirement for the sleep-eligible cell.

16. The network automation equipment of claim 13, wherein monitoring the performance associated with the cellular communication network comprises monitoring the performance of a neighbor cell that neighbors at least one of the respective sleep-eligible cells.

17. The network automation equipment of claim 16, wherein monitoring the performance of the neighbor cell comprises monitoring a throughput rate associated with the neighbor cell.

18. A non-transitory machine-readable medium, comprising executable instructions that, when executed by a processor, facilitate performance of operations at a network node, comprising:
receiving sleep feature activation parameters sent from network automation equipment to sleep-eligible cells at network nodes including the network node, wherein the sleep feature activation parameters are for a sleep-eligible cell at the network node;
receiving custom values for the sleep feature activation parameters from the network automation equipment, wherein the custom values comprise sleep threshold values and wake threshold values, and wherein different respective custom values are sent from the network automation equipment to different network nodes; and
using the custom values to trigger transitions of the sleep-eligible cell between an active state and a sleep state, wherein the network node initiates a transition of the sleep-eligible cell to the sleep state in response to existence of a sleep condition determined with reference to the sleep threshold values, and wherein the network node initiates a transition of the sleep-eligible cell to the active state in response to existence of an active condition determined with reference to the wake threshold values.

19. The non-transitory machine-readable medium of claim 18, wherein the operations further comprise sending cell configuration data associated with the sleep-eligible cell to the network automation equipment.

20. The non-transitory machine-readable medium of claim 18, wherein the operations further comprise reporting, to the network automation equipment, performance data representative of a performance of the network node during a time period comprising the transition of the sleep-eligible cell to the sleep state.

* * * * *